United States Patent [19]

Bryant

[11] 4,258,534
[45] Mar. 31, 1981

[54] AQUATIC HARVESTING APPARATUS

[76] Inventor: Charles B. Bryant, N67 W32380, Wildwood Point Rd., Hartland, Wis. 53029

[21] Appl. No.: 18,220

[22] Filed: Mar. 7, 1979

[51] Int. Cl.³ .......................................... A01D 44/00
[52] U.S. Cl. ......................................................... 56/9
[58] Field of Search .................................... 56/8, 9, 1

[56] References Cited

U.S. PATENT DOCUMENTS

| 1,080,144 | 12/1913 | Ennis | 56/9 |
| 3,521,386 | 7/1970 | Franchlyn | 56/9 |
| 3,546,858 | 12/1970 | Chaplin | 56/9 |

FOREIGN PATENT DOCUMENTS 618490  3/1961  Italy ................................................ 56/9

Primary Examiner—Jay N. Eskovitz
Attorney, Agent, or Firm—Henry C. Fuller

[57] ABSTRACT

Aquatic harvesting apparatus for removing waterborne vegetation from the water includes a harvesting barge with a pick-up conveyor, converging booms or pontoons pivotally connected to the barge to form a pick-up throat and a pump on the barge connected to a suction head adjacent the pick-up conveyor and in the throat to accelerate water and weed flow onto the pick-up conveyor. Discharge nozzles connected to the pump and supported adjacent the ends of the booms also induce water flow toward the pick-up throat.

3 Claims, 3 Drawing Figures

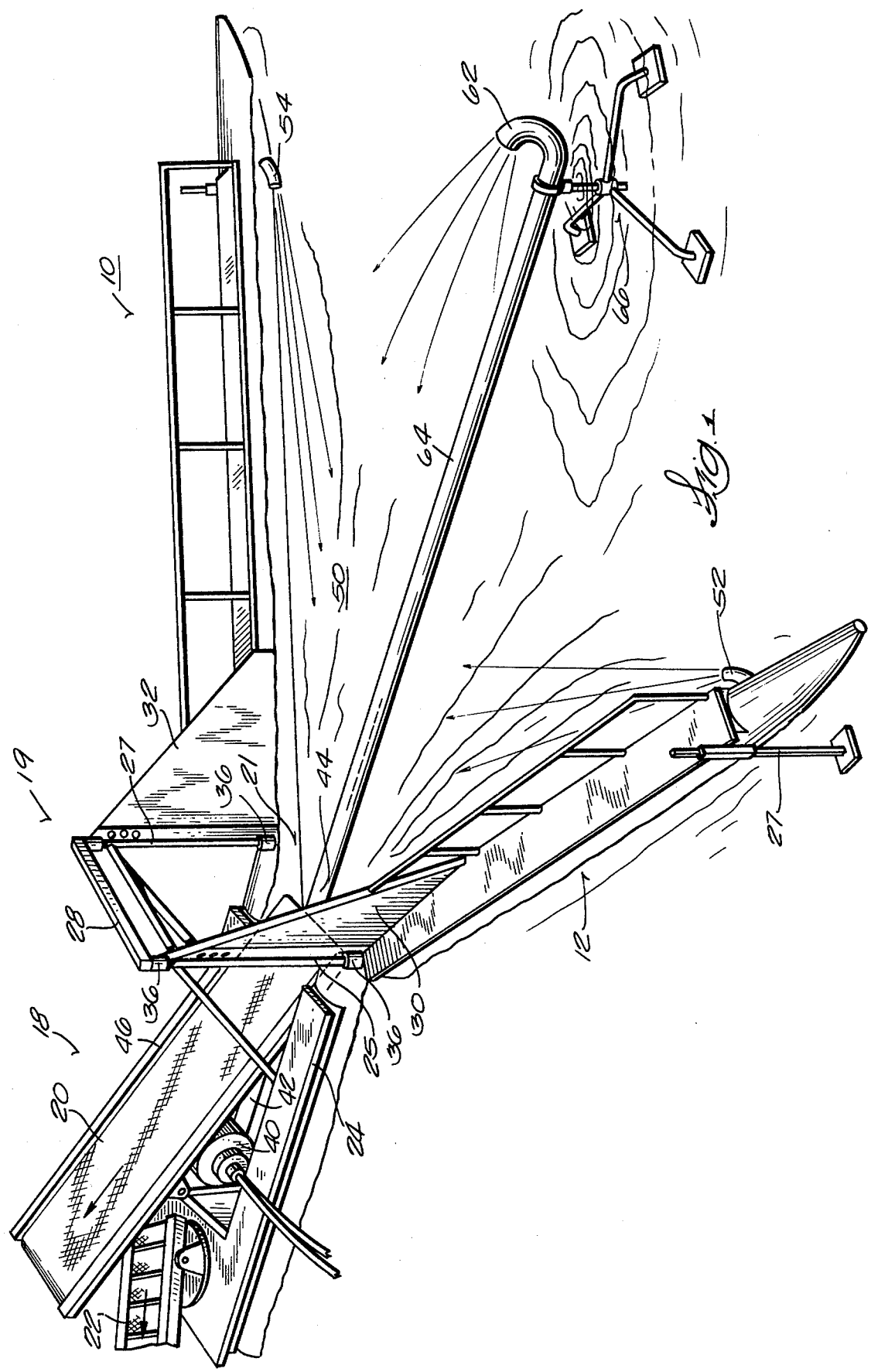

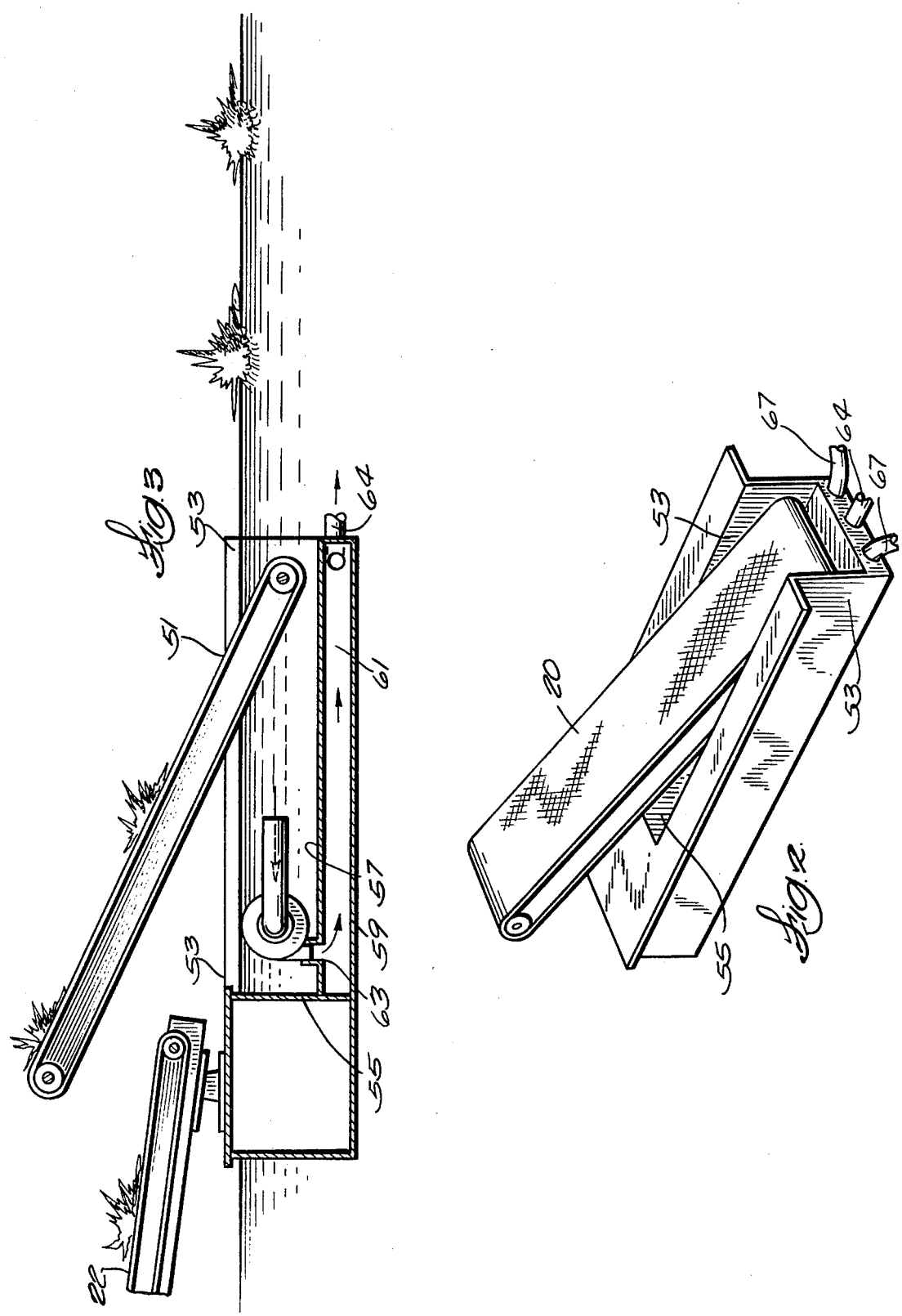

AQUATIC HARVESTING APPARATUS

BACKGROUND OF THE INVENTION

My prior U.S. Pat. No. 3,688,478 discloses apparatus for harvesting floating vegetation such as water hyacinth. This patent also discloses use of a harvesting barge in either a mobile or stationary mode. In a stationary mode, it depends upon water current to bring the water hyacinth or other floating vegetation to the pick-up conveyor which elevates the hyacinth from the water and delivers the hyacinth to a centrifugal thrower which discharges the weeds onto the shore or onto a harvesting barge. It is desirable to concentrate the floating hyacinth prior to harvest to increase the production of the equipment. However, if the accumulated hyacinth complement forms an integrated complement, flow of the complement toward the pick-up conveyor in the harvest zone may stop and the hyacinth will become more densely concentrated but may not move onto the pick-up conveyor. The present invention is a further development of my U.S. Pat. Nos. 3,688,478 and 3,653,192 and relates to the method and apparatus for enhancing the capacity of equipment to harvest floating vegetation by use of a push-pull circulation system to accelerate weed and water movement and cause turbulence to break up the advancing front of hyacinth into harvestable clumps.

SUMMARY OF THE INVENTION

The invention provides aquatic harvesting apparatus which is particularly adapted for use in a stationary mode where there is no natural water current to carry the floating vegetation to a pick-up conveyor on a harvest barge. The lower end of the pick-up conveyor is located at a throat formed by two converging floats or booms. A suction head adjacent the throat and behind the mesh pick-up conveyor accelerates water flow through the throat. Water nozzles connected to the discharge of the pump and supported at the outer ends of the booms direct water toward the throat to assist in accelerating water flow and vegetation. An additional water nozzle located generally opposite the converging throat and intermediate the ends of the booms assists in accelerating the vegetation toward the pick-up conveyor. The water jets create considerable turbulence and break up the advancing hyacinth front in harvestable clumps.

Further objects, features and advantages of the invention will be apparent from the disclosure.

DESCRIPTION OF THE DRAWINGS

FIG. 1 is a diagrammatic perspective view of apparatus in accordance with the invention.

FIG. 2 is a perspective view of the conveyor suction trough.

FIG. 3 is a side elevation view of the apparatus shown in FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The aquatic harvesting apparatus of the invention includes booms or pontoons 10 and 12 which are pivotally connected or hinged to a harvesting barge 18 to define a weed acceleration throat 21. The harvesting barge is provided with a pick-up conveyor 20 and a discharge conveyor 22 for discharge of the weeds on shore or on an auxiliary conveyor (not shown). The discharge conveyor can also be employed to deposit weeds on a transport barge.

The harvesting barge 18 includes a U-shaped frame 19 supported by spaced pontoons 24. The U-shaped frame 19 includes two upstanding cylindrical posts 25, 27 which are interconnected by a cross member 28. The booms 10 and 12 are pivotally connected to the posts 25, 27 to afford selection of various angles of convergence. The means provided to connect the pontoons to the barge can include upstanding weed deflectors 30, 32, each of which is fixed to a portion 10, 12. The deflectors can be connected with bearings or sleeves 36 which are arranged on the posts 25, 27 to provide hinged movement of the booms.

The booms 10 and 12 can be adjusted at varying angles of convergence, with the selected angle being suitable for the density of vegetation contained in the water and the conveying capacity of the pick-up conveyor. The selected angle will desirably avoid clogging of the throat 21. The portions 10, 12 can be secured at the appropriate angle by posts 27 which engage the bottom.

Flow of water-borne vegetation into the throat and onto the pick-up conveyor 20 is induced by water pumping means. In the disclosed construction, the pumping means comprises a high volume pump 40 supported on the barge 18. The pump has an intake conduit 42 with an intake 44 located behind the mesh belt 46 of the conveyor 20 and slightly under the water surface 50. The mesh belt 20 has a portion 51 located beneath the water surface.

In accordance with the invention, wall means are provided in association with the conveyor 20 for confining the submerged portion of said conveyor to afford channelized communication of the pump inlet with the acceleration throat 21. As illustrated in FIG. 2, the wall means includes spaced oppositely located side walls 53, a rear wall 55 and a pair of spaced bottom walls 57, 59 which form a chamber 61. The outlet 63 of the pump communicates with chamber 61. The chamber 61 is connected to hoses 67 which discharge through nozzles 52, 54. The nozzles are adjustably supported on the pontoons 10, 12 so that the appropriate angle of discharge can be selected and, if required, employed to sweep the floating vegetation away from the pontoons. The acceleration of water and vegetation into the throat 21 and the turbulence can be enhanced by the use of a further nozzle 62 which is connected to chamber 61 by a conduit 64. The nozzle 62 can be supported from the bottom by a stand 66.

The pump and the water flow characteristics from the nozzles are desirably such that the water jets create turbulence to break up the advancing hyacinth front and accelerate the plants in discrete clumps into and through the throat 21. The angle of convergence of the booms or pontoons 10 and 12 is selected to handle the flow of hyacinth without clogging the throat. To operate effectively, the vegetation must be substantially accelerated in velocity as the vegetation moves through the throat, otherwise clogging can occur.

I claim:

1. Aquatic harvesting apparatus comprising a harvesting barge including a pick-up conveyor with a foraminous belt adjusted to have a conveyor portion extending beneath the surface of the water, a pair of spaced boom means pivotally connected to said barge to provide a converging pick-up throat above said conveyor portion and water pumping means associated with said throat including a suction head in said throat beneath said foraminous conveyor, wall means including side walls and a bottom wall arranged around said submerged conveyor portion to direct water flow toward said foraminous conveyor and to convey harvested material onto said conveyor while allowing water to pass through the foraminous conveyor belt to supply the requirements of said pumping means, and water nozzles connected to said pumping means and supported on said booms to direct water into said throat.

2. The apparatus of claim 1 wherein said harvesting barge has a pair of spaced pontoons and an inverted U-shaped frame connecting said pontoons, and pivot means on said booms connected to said frame.

3. Apparatus for harvesting water borne aquatic vegetation comprising converging first and second boom means lying on the legs of an angle of convergence and defining a vegetation concentration zone, means interconnecting the boom means to afford adjustment of the angle of convergence of said boom means and spacing of the inner ends of said boom means to define an acceleration throat, a foraminous pick-up conveyor having a lower end associated with said throat for removing vegetation from said throat and water propelling means located within said concentration zone and remote from said throat and behind said pick-up conveyor to induce water flow toward said throat, and means associated with said conveyor to confine said lower end of said conveyor and afford channelized communication of the water propelling means with the acceleration throat.

* * * * *